US012794543B2

United States Patent
(12) United States Patent
Huang et al.

(10) Patent No.: US 12,794,543 B2
(45) Date of Patent: Nov. 10, 2026

(54) IAB DYNAMIC CAPABILITY UPDATES

(71) Applicant: Telefonaktiebolaget LM Ericsson (publ), Stockholm (SE)

(72) Inventors: Yezi Huang, Täby (SE); Lei Bao, Gothenburg (SE); Magnus Åström, Lund (SE); Boris Dortschy, Vendelsö (SE); Behrooz Makki, Pixbo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 406 days.

(21) Appl. No.: 18/249,295

(22) PCT Filed: Oct. 19, 2021

(86) PCT No.: PCT/EP2021/078923
§ 371 (c)(1),
(2) Date: Apr. 17, 2023

(87) PCT Pub. No.: WO2022/084301
PCT Pub. Date: Apr. 28, 2022

(65) Prior Publication Data

US 2023/0412250 A1 Dec. 21, 2023

Related U.S. Application Data

(60) Provisional application No. 63/093,367, filed on Oct. 19, 2020.

(51) Int. Cl.
*H04B 7/155* (2006.01)
*H04L 5/00* (2006.01)

(52) U.S. Cl.
CPC ....... *H04B 7/15542* (2013.01); *H04L 5/0055* (2013.01)

(58) Field of Classification Search
CPC ........... H04B 7/15542; H04B 7/15528; H04L 5/0055
(Continued)

(56) References Cited

U.S. PATENT DOCUMENTS 11,082,979 B2 8/2021 Seo et al.
11,303,349 B2 4/2022 Jo et al.
(Continued)

FOREIGN PATENT DOCUMENTS

CN 110278610 B 9/2019
CN 110692272 A 1/2020
(Continued)

OTHER PUBLICATIONS

CEWiT, "Discussions on enhancements to resource multiplexing between child and parent links of an IAB node", R1-2006329, Aug. 17-28, 2020 (From Applicant's IDS) (Year: 2020).*
(Continued)

*Primary Examiner* — Mang Hang Yeung
(74) *Attorney, Agent, or Firm* — Weisberg I.P. Law, P.A.

(57) ABSTRACT

A method, system and apparatus are disclosed. According to one or more embodiments, an integrated access and backhaul, IAB, node including an IAB-mobile termination, MT, and an IAB-distributed unit, DU is provided. The IAB node includes processing circuitry configured to determine at least one multiplexing condition associated with a multiplexing capability where the multiplexing capability is associated at least with a capability of performing simultaneous communications by the IAB-MT and IAB-DU, and transmit, to a another IAB node, information associated with the determined at least one dynamic multiplexing condition.

24 Claims, 8 Drawing Sheets

(58) Field of Classification Search
USPC .......................................................... 370/315
See application file for complete search history.

(56) References Cited

U.S. PATENT DOCUMENTS

| | | | | |
|---|---|---|---|---|
| 12,267,813 | B2 | 4/2025 | Zhang et al. | |
| 2019/0349079 | A1 | 11/2019 | Novlan et al. | |
| 2020/0084819 | A1 | 3/2020 | Abedini et al. | |
| 2020/0145997 | A1 | 5/2020 | Luo et al. | |
| 2020/0336890 | A1* | 10/2020 | Abedini | H04B 7/0697 |
| 2021/0100012 | A1* | 4/2021 | Miao | H04W 72/23 |
| 2021/0168852 | A1 | 6/2021 | Panteleev et al. | |
| 2021/0243782 | A1 | 8/2021 | Miao | |
| 2021/0289421 | A1 | 9/2021 | Akl et al. | |
| 2021/0368360 | A1* | 11/2021 | Akl | H04W 92/20 |
| 2021/0368481 | A1* | 11/2021 | Jo | H04W 72/21 |
| 2022/0217661 | A1* | 7/2022 | Yokomakura | H04B 7/155 |
| 2022/0287123 | A1* | 9/2022 | Tiirola | H04L 5/16 |
| 2022/0361174 | A1* | 11/2022 | Liu | H04L 27/2605 |
| 2023/0108413 | A1* | 4/2023 | You | H04W 72/20 370/329 |
| 2023/0117298 | A1 | 4/2023 | Park et al. | |
| 2023/0164747 | A1* | 5/2023 | You | H04W 74/0833 370/329 |
| 2023/0164793 | A1* | 5/2023 | Ghanbarinejad | H04W 16/02 370/329 |
| 2023/0345553 | A1* | 10/2023 | Maya | H04W 56/0045 |
| 2023/0412250 | A1 | 12/2023 | Huang et al. | |

FOREIGN PATENT DOCUMENTS

| | | | |
|---|---|---|---|
| EP | 4096326 | A1 | 11/2022 |
| EP | 4 117 387 | B1 | 1/2023 |
| KR | 20200050280 | A | 5/2020 |
| WO | 2017/014572 | A1 | 1/2017 |
| WO | 2018/143702 | A1 | 8/2018 |
| WO | 2020010613 | A1 | 1/2020 |
| WO | 2020032578 | A1 | 2/2020 |
| WO | 2020145358 | A1 | 7/2020 |
| WO | 2020239042 | A1 | 12/2020 |
| WO | 2021028785 | A1 | 2/2021 |
| WO | 2021/178788 | A1 | 9/2021 |
| WO | 2021205343 | A1 | 10/2021 |
| WO | 2022084301 | A1 | 4/2022 |
| WO | 2022214528 | A1 | 10/2022 |

OTHER PUBLICATIONS

International Search Report and Written Opinion dated Feb. 8, 2022 for International Application No. PCT/EP2021/078923 filed Oct. 19, 2021, consisting of 13-pages.

3GPP TSG-RAN WG1 Meeting #99 R1-1912133; Title: Remaining issues on IAB resource configuration and multiplexing; Agenda Item: 7.2.3.1; Source: Ericsson; Document for: Discussion; Date and Location: Nov. 18-22, 2019, Reno, US, consisting of 5-pages.

3GPP TSG RAN WG1 Meeting #102-e R1-2006329; Title: Discussions on enhancements to resource multiplexing between child and parent links of an IAB node; Agenda Item: 8.10.1; Source: CEWiT; Document for: Discussions; Date and Location: Aug. 17-28, 2020, e-Meeting, consisting of 7-pages.

3GPP TSG RAN WG1 Meeting #102-e R1-2006361; Title: Discussion on IAB resource multiplexing enhancements; Agenda Item: 8.10.1; Source: ETRI; Document for: Discussion/Decision; Date and Location: Aug. 17-28, 2020, e-Meeting, consisting of 8-pages.

3GPP TSG-RAN WG3 Meeting #107-e R3-201144; Title: CB # 45_Email045-IAB_PHYlayer_param_F1AP; Agenda tem: 13.2.1. 4; Source: Qualcomm Incorporated; Document for: Agreement; Date and Location: Feb. 24-Mar. 6, 2020, Electronic Meeting, consisting of 6-pages.

3GPP TR 38.874 V16.0.0; 3rd Generation Partnership Project; Technical Specification Group Radio Access Network; NR; Study on Integrated Access and Backhaul; (Release 16); Dec. 2018, consisting of 111-pages.

3GPP TS 38.473 V15.4.0; 3rd Generation Partnership Project; Technical Specification Group Radio Access Network; NG-RAN; F1 application protocol (F1AP) (Release 15); Dec. 2018, consisting of 192-pages.

Office Action dated Feb. 27, 2025 for U.S. Appl. No. 17/917,521, filed Oct. 6, 2022, consisting of 25 pages.

International Search Report and Written Opinion dated Nov. 16, 2022 for International Application No. PCT/EP2022/070960 filed Jul. 26, 2022; consisting of 19 pages.

3GPP TSG RAN Meeting #88e, RP-201293 (revision of RP-193251); Title: New WID on Enhancements to Integrated Access and Backhaul; Source: Qualcomm; Document for: Approval; Agenda Item: 9.10. 10; Date and Location: Jun. 29-Jul. 3, 2020, Electronic Meeting; consisting 6 pages.

3GPP TSG-RAN WG1 Meeting #104-bis-e, R1-2103712; Title: Resource multiplexing and DC in enhanced IAB; Agenda Item: 8.10.1; Source: Ericsson; Document for: Discussion, Decision; Date and Location: Apr. 12-20, 2021, eMeeting; consisting 15 pages.

3GPP TSG RAN WG1 #104b-e, R1-2102538; Title: Enhancement to resource multiplexing between child and parent links; Source: vivo; Agenda Item: 8.10.1; Document for: Discussion and Decision; Date and Location: Apr. 12-20, 2021, e-Meeting; consisting of 8 pages.

3GPP TS 38.473 V16.6.0; 3rd Generation Partnership Project; Technical Specification Group Radio Access Network; NG-RAN; F1 application protocol (F1AP) (Release 16); Jul. 2021; consisting of 466 pages.

3GPP TSG-RAN WG1 Meeting #100-e R1-2001452; Title: Corrections on integrated access and backhaul; Source to WG: Samsung; Work item code: NR_IAB-Core; Date and Location: Feb. 24-Mar. 6, 2020, e-Meeting; consisting of 5 pages.

3GPP TSG RAN Meeting #86 RP-193251 (revision of RP-193145); Title: New WID on Enhancements to Integrated Access and Backhaul; Source: Qualcomm; Document for: Approval: Agenda Item: 9.1.2; Date and Location: Dec. 9-12, 2019, Sitges, Spain; consisting of 5 pages.

3GPP TSG RAN WG1 #96 R1-1901894; Title: Mechanisms for resource coordination and radio-aware scheduling for IAB; Agenda Item: 7.2.3.6; Source: AT Document for: Discussion/Approval; Date and Location: Feb. 25-Mar. 1, 2019, Athens, Greece; consisting of 6 pages.

3GPP TSG RAN WG1 Meeting #98 R1-1908987; Title: Mechanisms for resource multiplexing among backhaul and access links; Agenda item: 7.2.3.3; Source: Nokia, Nokia Shanghai Bell; Document for: Discussion and Decision; Date and Location: Aug. 26-30, 2019, Prague, Czech Republic; consisting of 20 pages.

3GPP TSG RAN WG1 Meeting #96 R1-1902992; Title: IAB Resource Management Framework; Agenda Item: 7.2.3.2; Source: Qualcomm Incorporated; Document for: Discussion and decision; Date and Location: Feb. 25-Mar. 1, 2019; Athens, Greece; consisting of 8 pages.

3GPP TSG-RAN WG1 Meeting #100-e R1-2001160; Title: Summary #2 of 7.2.3.3—Mechanisms for resource multiplexing among backhaul and access links; Agenda Item: 7.2.3.3; Source: AT Document for: Discussion/Approval; Date and Location: Feb. 24-Mar. 6, 2020, e-Meeting; consisting of 19 pages.

3GPP TS 38.473 V16.4.0; 3rd Generation Partnership Project; Technical Specification Group Radio Access Network; NG-RAN; F1 application protocol (F1AP) (Release 16); Jan. 2021; consisting of 461 pages.

3GPP TSG-RAN WG1 Meeting #104-e R1-2101695; Title: Resource multiplexing and DC in enhanced IAB; Agenda Item: 8.10.1; Source: Ericsson; Document for: Discussion, Decision; Date and Location: Jan. 25-Feb. 5, 2021, e-Meeting; consisting of 14 pages.

European Office Action dated Oct. 18, 2023 for European Application No. EP21718661.8; consisting of 6 pages.

International Search Report and Written Opinion dated Jun. 16, 2021 for International Application No. PCT/IB2021/052852 filed Apr. 6, 2021; consisting of 10 pages.

Office Action dated Jan. 16, 2026 issued in U.S. Appl. No. 18/291,427, consisting of 71 pages.

Office Action dated Sep. 26, 2025 for U.S. Appl. No. 18/553,887; consisting of 29 pages.

(56) References Cited

OTHER PUBLICATIONS

European Office Action dated Nov. 7, 2025 for Application No. 21718661.8; consisting of 6 pages.
3GPP TS 38.425 V15.6.0; 5G; 3rd Generation Partnership Project; Technical Specification Group Radio Access Network; NG-RAN; NR user plane protocol (Release 15); Jul. 2019; consisting of 22 pages.
3GPP TS 23.501 V15.5.0; 3rd Generation Partnership Project; Technical Specification Group Services and System Aspects; System Architecture for the 5G System; Stage 2 (Release 15); Mar. 2019; consisting of 241 pages.
3GPP TS 29.281 V15.6.0; 3rd Generation Partnership Project; Technical Specification Group Core Network and Terminals; General Packet Radio System (GPRS) Tunnelling Protocol User Plane (GTPv1-U) (Release 15); Sep. 2019; consisting of 32 pages.
3GPP TS 33.401 V15.8.0; 3rd Generation Partnership Project; Technical Specification Group Services and System Aspects; 3GPP System Architecture Evolution (SAE); Security architecture (Release 15); Jun. 2019; consisting of 163 pages.
3GPP TS 38.213 V16.5.0; 3rd Generation Partnership Project; Technical Specification Group Radio Access Network NR; Physical layer procedures for control (Release 16); Mar. 2021, consisting of 183 pages.
3GPP TS 38.321 V15.2.0; 3rd Generation Partnership Project; Technical Specification Group Radio Access Network; NR; Medium Access Control (MAC) protocol specification (Release 15), Jun. 2018; consisting of 73 pages.
3GPP TS 38.331 V16.4.0; 3rd Generation Partnership Project; Technical Specification Group Radio Access Network; NR; Radio Resource Control (RRC) protocol specification (Release 16); Mar. 2021; consisting of 949 pages.
3GPP TS 38.401 V15.6.0; 3rd Generation Partnership Project; Technical Specification Group Radio Access Network; NG-RAN; Architecture description (Release 15); Jul. 2019; consisting of 46 pages.
3GPP TS 38.463 V15.4.0; 3rd Generation Partnership Project; Technical Specification Group Radio Access Network; NG-RAN; E1 Application Protocol (E1AP) (Release 15); Jul. 2019; consisting of 177 pages.
3GPP TS 38.473 V15.6.0; 3rd Generation Partnership Project; Technical Specification Group Radio Access Network; NG-RAN; F1 application protocol (F1AP) (Release 15); Jul. 2019; consisting of 220 pages.
3GPP TR 38.801 V14.0.0; 3rd Generation Partnership Project; Technical Specification Group Radio Access Network; Study on new radio access technology: Radio access architecture and interfaces (Release 14); Mar. 2017; consisting of 91 pages.
3GPP TR 38.806 V15.0.0; 3rd Generation Partnership Project; Technical Specification Group Radio Access Network; Study of separation of NR Control Plane (CP) and User Plane (UP) for split option 2; (Release 15); Dec. 2017; consisting of 22 pages.
3GPP TSG-RAN WG1 Meeng #105-e R1-2105852; Title: Resource mulplexing and DC in enhanced IAB; Agenda Item: 8.10.1; Source: Ericsson; Document for: Discussion, Decision; Location and Date: Online, May 10-May 27, 2021; consisting of 18 pages.
3GPP TSG-RAN WG1 Meeting #106-e R1-2108107; Title: Resource multiplexing and dual connectivity in enhanced IAB; Agenda Item: 8.10.1; Source: Ericsson; Document for: Discussion, Decision; Location and Date: Online, Aug. 16-27, 2021; consisting of 21 pages.
3GPP TSG-RAN WG1 Meeting #106bis-e R1-2110331; Title: Resource multiplexing and dual connectivity in enhanced IAB; Agenda Item: 8.10.1; Source: Ericsson; Document for: Discussion, Decision; Location and Date: Online, Oct. 11-19, 2021; consisting of 20 pages.
3GPP TR 38.874 V0.2.1; 3rd Generation Partnership Project; Technical Specification Group Radio Access Network; Study on Integrated Access and Backhaul; (Release 15); May 2018; consisting of 19 pages.
Office Action dated Jan. 27, 2026 for U.S. Appl. No. 17/917,521, filed Oct. 6, 2022; consisting of 22 pages.
Notice of Allowance dated Apr. 28, 2026 for U.S. Appl. No. 18/291,427, filed Jan. 23, 2024; consisting of 16 pages.
Chinese Office Action and machine English translation of the Chinese Office Action dated Jul. 22, 2024 issued in Chinese Application No. 202180085789.3, consisting of 20 pages.
3GPP TSG RAN WG1 #99 R1-1912838; Source: AT Title: Mechanisms for supporting access and backhaul link multiplexing; Document for: Discussion/Approval; Agenda Item: 7.2.3.1; Reno, NV, Nov. 18-22, 2019, consisting of 8 pages.

* cited by examiner

IAB DYNAMIC CAPABILITY UPDATES

CROSS-REFERENCE TO RELATED APPLICATIONS

This application is a Submission Under 35 U.S.C. § 371 for U.S. National Stage Patent Application of International Application No.: PCT/EP2021/078923, filed Oct. 19, 2021 entitled "IAB DYNAMIC CAPABILITY UPDATES," which claims priority to U.S. Provisional Application No. 63/093,367, filed Oct. 19, 2020, entitled "IAB DYNAMIC CAPABILITY UPDATES," the entireties of both of which are incorporated herein by reference.

FIELD

The present disclosure relates to wireless communications, and in particular, to dynamic multiplexing capability in an integrated access and backhaul (IAB) node.

BACKGROUND

Integrated Access and Backhaul (IAB)

Densification via the deployment of an increasing quantity of nodes, e.g., macro or micro nodes, is one of the mechanisms that can be employed to satisfy the ever-increasing demand for more and more bandwidth/capacity in mobile networks. Due to the availability of more spectrum in the millimeter wave (mmw) band, deploying small cells that operate in this band is one deployment option for these purposes. However, deploying fiber optic cable to the small cells, which is the usual way in which small cells are deployed, can end up being very expensive and impractical. Thus, employing a wireless link for connecting the small cells to the operator's network is a cheaper and practical alternative with more flexibility and shorter time-to-market when compared to the fiber optic cable approach. One such solution is an Integrated Access and Backhaul (IAB) network, where the operator can utilize part of the radio resources for the backhaul link.

In FIG. 1, a diagram of an IAB deployment that supports multiple hops is illustrated. The IAB donor node (referred to as "IAB donor") has a wired connection (e.g., fiber, electrical, etc.) to the core network and the IAB nodes (e.g., IAB node 1 and IAB node 2) are wirelessly connected using NR to the IAB donor, either directly or indirectly via another IAB node. The connection between IAB donor/node and wireless devices is called access link, whereas the connection between two IAB nodes or between an IAB donor and an IAB node is called backhaul link.

Furthermore, as shown in FIG. 2, the adjacent upstream node which is closer to the IAB donor node of an IAB node is referred to as a parent node of the IAB node. The adjacent downstream node which is further away from the IAB donor node of an IAB node is referred to as a child node of the IAB node. The backhaul link between the parent node and the IAB node is referred to as parent (backhaul) link, whereas the backhaul link between the IAB node and the child node is referred to as child (backhaul) link.

IAB Architecture

One difference of the IAB architecture compared to a Third Generational Partnership Project (3GPP) Release (Rel)-10 Long Term Evolution (LTE) relay (besides lower layer differences) is that the IAB architecture adopts the Central-Unit/Distributed-Unit (CU/DU) split of IAB nodes (e.g., gNBs) in which time-critical functionalities are realized in the DU closer to the radio, whereas the less time-critical functionalities are pooled in the CU with the opportunity for centralization. Based on this architecture, an IAB donor contains both CU and DU functions. In particular, the IAB donor contains all CU functions of the IAB nodes under the same IAB donor. Each IAB node then hosts the DU function(s) of a IAB node. In order to be able to transmit/receive wireless signals to/from the upstream IAB node or IAB donor, each IAB node has a mobile termination (MT), which is a logical unit providing a set of wireless device-like functions. The IAB-node establishes radio link control (RLC)-channel to wireless devices and/or to MTs of the connected IAB-node(s) via the DU. The IAB node establishes the backhaul radio interface towards the serving IAB node or IAB donor via the MT. FIG. 3 is a diagram of a two-hop chain of IAB nodes under an IAB donor.

IAB Topologies

Wireless backhaul links may be vulnerable to blockage, e.g., due to one or more of moving objects such as vehicles, due to seasonal changes (foliage), severe weather conditions (rain, snow or hail), and due to infrastructure changes (new buildings). Such vulnerability also applies to IAB nodes. Also, traffic variations can create uneven load distribution on wireless backhaul links leading to local link or node congestion. In view of those concerns, the IAB topology supports redundant paths, which is another difference compared to the 3GPP Rel-10 LTE relay.

The following topologies are illustrated in FIG. 4 and are considered below:

Spanning tree (ST)

Directed acyclic graph (DAG)

One IAB node can have multiple child nodes and/or have multiple parent nodes. Particularly regarding multi-parent topology, different scenarios may be considered as shown in FIG. 5. For example:

- IAB 9 (i.e., IAB node 9) connects to IAB donor 1 via two parent nodes IAB 5 and IAB 6 which connect to the same grandparent node IAB 1;
- IAB 10 connects to IAB donor 1 via two parent nodes IAB 6 and IAB 7 which connect to different grandparent nodes IAB 1 and IAB 2;
- IAB 8 connects to two parent nodes IAB 3 and IAB 4 which connect to different IAB donor nodes IAB donor 1 and IAB donor 2.

The multi-connectivity or route redundancy may be used for back-up purposes. It is also possible that redundant routes are used concurrently, e.g., to achieve load balancing, reliability, etc.

Resource Coordination

In case of in-band operation, the IAB node is typically subject to the half-duplex constraint, i.e., an IAB-node can only be in either in transmission or reception mode at a time. 3GPP Rel-16 IAB consider the time-division multiplexing (TDM) case where the MT and DU resources of the same IAB-node are separated in time. Based on this consideration, the following resource types have been defined for IAB MT and DU, respectively.

From an IAB node MT point-of-view, as in 3GPP Rel-15, the following example time-domain resources can be indicated for the parent link:

Downlink (DL) time resource

Uplink (UL) time resource

Flexible (F) time resource

From an IAB node DU point-of-view, the child link may have the following example types of time resources:

DL time resource

UL time resource

Flexible (F) time resource

Not-available (NA) time resources (resources not to be used for communication on the DU child links)

Each of the downlink, uplink and flexible time-resource types of the DU child link may belong to one of two categories:

Hard (H): The corresponding time resource is always available for the DU child link Soft (S): The availability of the corresponding time resource for the DU child link is explicitly and/or implicitly controlled by the parent node.

The IAB DU resources are configured per cell, and the H/S/NA attributes for the DU resource configuration are explicitly indicated per-resource type (D/U/F) in each slot. As a result, the semi-static time-domain resources of the DU part can be of seven types in total: Downlink-Hard (DL-H), Downlink-Soft (DL-S), Uplink-Hard (UL-H), Uplink-Soft (UL-S), Flexible-Hard (F-H), Flexible-Soft (F-S), and Not-Available (NA). The coordination relation between MT and DU resources are listed in Table 1.

IAB MT and IAB DU is additionally provided with respect to each transmission-direction combination (per MT CC/DU cell pair):

MT-TX/DU-TX

MT-TX/DU-RX

MT-RX/DU-TX

MT-RX/DU-RX

The corresponding signaling has been defined in 3GPP technical specification (TS) 38.473, clause 9.3.1.108 as part of the F1 application protocol (F1-AP) information element (IE), which is an L3 signaling interface between a gNB-CU (IAB-CU) and a gNB-DU (IAB-DU).

When configuring the semi-static IAB DU resources, the IAB donor-CU makes use of the provided information about the IAB node's multiplexing capability to coordinate resource usage across the multi-hop IAB topology. The parent node can also be provided with that information so that it can make a better assumption of the resource usage at the IAB node and thereby the resource availability on the parent backhaul link connecting between the parent node and the IAB node. However, the IAB node's multiplexing capability can depend on certain IAB node's specific conditions that can affect and change the IAB node's multiplexing capability based on changing and therefore dynamic conditions. For example, based on given hardware capability, certain channel conditions allow the IAB-MT and IAB-DU to transmit and/or receive simultaneously. The IAB node may indicate such multiplexing capability to the IAB donor-CU, which will configure IAB-MT and IAB-DU resources accordingly. However, the required Case #6 and Case #7 timing operation as defined in 3GPP Technical Reference (TR) 38.874, v16.0.0 may be fulfilled by the parent node(s) and/or child node(s) under certain circumstances. In this case, the IAB-MT and IAB-DU can be limited to operate in a TDM manner, e.g., opposite to some simultaneous operation in frequency division multiplexing (FDM) or space

TABLE 1

Coordination between MT and DU resources of an IAB-node

| | | MT configuration | | |
|---|---|---|---|---|
| | | DL | UL | Flexible |
| DU configuration | DL-H | DU: can transmit on DL unconditionally; MT: not available. | DU: can transmit on DL unconditionally; MT: not available. | DU: can transmit on DL unconditionally; MT: not available. |
| | DL-S | DU: can transmit conditionally; MT: available on DL. | DU: can transmit conditionally; MT: available on UL. | DU: can transmit conditionally; MT: available on DL & UL. |
| | UL-H | DU: can schedule UL unconditionally; MT: not available. | DU: can schedule UL unconditionally; MT: not available. | DU: can schedule UL unconditionally; MT: not available. |
| | UL-S | DU: can schedule UL conditionally; MT: available on DL. | DU: can schedule UL conditionally; MT: available on UL. | DU: can schedule UL conditionally; MT: available on DL & UL. |
| | F-H | DU: can transmit on DL or schedule UL unconditionally; MT: not available. | DU: can transmit on DL or schedule UL unconditionally; MT: not available. | DU: can transmit on DL or schedule UL unconditionally; MT: not available. |
| | F-S | DU: can transmit on DL or schedule UL conditionally; MT: available on DL. | DU: can transmit on DL or schedule UL conditionally; MT: available on UL. | DU: can transmit on DL or schedule UL conditionally; MT: available on DL & UL. |
| | NA | DU: not available; MT: available on DL. | DU: not available; MT: available on UL. | DU: not available; MT: available on DL & UL. |

Furthermore, a DU function may correspond to multiple cells, including cells operating on different carrier frequencies. Similarly, an MT function may correspond to multiple carrier frequencies. This can either be implemented by one MT unit operating on multiple carrier frequencies, or be implemented by multiple MT units, each operating on different carrier frequencies. The H/S/NA attributes for the per-cell DU resource configuration may take into account the associated MT carrier frequency(ies).

To facilitate such configuration, 3GPP states in Radio Access Network 1 (RAN1) #98bis that: The donor CU and the parent node can be made aware of the multiplexing capability between MT and DU (TDM required, TDM not required) of an IAB node to for any {MT CC, DU cell} pair.

RAN1 #99 further states that the indication of the multiplexing capability is as follows: The indication of the multiplexing capability for the case of no-TDM between division multiplexing (SDM). Without such information, the parent node may schedule transmission from/to the IAB node which cannot be carried out by the IAB node and thereby waste limited resources and/or causes situations of additional interference to the IAB-node.

SUMMARY

Some embodiments advantageously provide methods, systems, and apparatuses for dynamic multiplexing capability in an IAB node.

One or more embodiments of the present disclosure solves one or more problems with existing systems at least in part by providing semi-static multiplexing capability to the IAB donor-CU and optionally to the parent IAB node, and the IAB-node may also evaluate dynamic changes of the multiplexing capability (e.g., multiplexing conditions) and update the associated information to the parent IAB node using Open Systems Interconnection (OSI) model Layer 1 (L1)/Layer 2 (L2)/Layer 3 (L3) signaling. One or more embodiments are advantageously able to reduce possible temporary resource conflicts at the IAB node and improve resource utilization of the IAB network.

According to one aspect of the disclosure, an integrated access and backhaul, IAB, node includes an IAB-mobile termination, MT, and an IAB-distributed unit, DU. The IAB node includes processing circuitry configured to determine at least one multiplexing condition associated with a multiplexing capability where the multiplexing capability is associated at least with a capability of performing simultaneous communications by the IAB-MT and IAB-DU, and transmit, to a another IAB node, information associated with the determined at least one dynamic multiplexing condition.

According to one or more embodiments of this aspect, the multiplexing capability is a semi-static multiplexing capability associated with a plurality of semi-static resource multiplexing resource configurations. According to one or more embodiments of this aspect, the plurality of semi-static resource multiplexing resource configurations includes a first configuration and a second configuration different from the first configuration where the information associated with the determined at least one multiplexing condition indicates the IAB node is able to operate in a first multiplexing configuration different from second multiplexing configuration where the second multiplexing configuration is a current configuration. According to one or more embodiments of this aspect, the first multiplexing configuration is one of a space division multiplexing, SDM, configuration, frequency division multiplexing, FDM, and a time division multiplexing, TDM, configuration.

According to one or more embodiments of this aspect, the processing circuitry is further configured to receive signaling indicating the information was one of acknowledged, ACK, and negative acknowledged, NACK. According to one or more embodiments of this aspect, the determination of the at least one multiplexing condition associated with the multiplexing capability is one of conducted periodically and triggered by at least one predefined event where the at least one predefined event includes at least one of: a change in at least one of transmission timing and receiving timing, a data rate change, and a signal-to-noise ratio change. According to one or more embodiments of this aspect, the information is part of an information exchange between the IAB node and the other IAB node for determining whether at least one of the IAB node and the other IAB node can fulfill at least one of a transmit power setting, a timing operation, and a transmission and reception mode.

According to one or more embodiments of this aspect, the processing circuitry is further configured to compare the at least one multiplexing condition associated with the multiplexing capability with a plurality of semi-static resource multiplexing resource configurations where the information associated with the determined at least one multiplexing condition is based on the comparison and indicating a current multiplexing capability is different from a current semi-static multiplexing configuration. According to one or more embodiments of this aspect, the other IAB node is a parent IAB node.

According to another aspect of the present disclosure, a method implemented by an integrated access and backhaul, IAB, node that includes an IAB-mobile termination, MT, and an IAB-distributed unit, DU, is provided. At least one multiplexing condition associated with a multiplexing capability is determined where the multiplexing capability associated at least with a capability of performing simultaneous communications by the IAB-MT and IAB-DU. Information associated with the determined at least one dynamic multiplexing condition is transmitted to another IAB node.

According to one or more embodiments of this aspect, the multiplexing capability is a semi-static multiplexing capability associated with a plurality of semi-static resource multiplexing resource configurations. According to one or more embodiments of this aspect, the plurality of semi-static resource multiplexing resource configurations includes a first configuration and a second configuration different from the first configuration where the information associated with the determined at least one multiplexing condition indicates the IAB node is able to operate in a first multiplexing configuration different from second multiplexing configuration and where the second multiplexing configuration is a current configuration. According to one or more embodiments of this aspect, the first multiplexing configuration is one of a space division multiplexing, SDM, configuration, frequency division multiplexing, FDM, and a time division multiplexing, TDM, configuration.

According to one or more embodiments of this aspect, signaling indicating the information was one of acknowledged, ACK, and negative acknowledged, NACK, is received. According to one or more embodiments of this aspect, the determination of the at least one multiplexing condition associated with the multiplexing capability is one of conducted periodically and triggered by at least one predefined event where the at least one predefined event includes at least one of a change in at least one of transmission timing and receiving timing, a data rate change, and a signal-to-noise ratio change. According to one or more embodiments of this aspect, the information is part of an information exchange between the IAB node and the other IAB node for determining whether at least one of the IAB node and the other IAB node can fulfill at least one of: a transmit power setting, a timing operation; and a transmission and reception mode.

According to one or more embodiments of this aspect, the at least one multiplexing condition associated with the multiplexing capability is compared with a plurality of semi-static resource multiplexing resource configurations where the information associated with the determined at least one multiplexing condition is based on the comparison and indicating a current multiplexing capability is different from a current semi-static multiplexing configuration. According to one or more embodiments of this aspect, the other IAB node is a parent IAB node.

According to another aspect of the present disclosure, an integrated access and backhaul, IAB, node that is configured to communicate with a child IAB node is provided. The child IAB node includes a child IAB-mobile termination, MT, and a child IAB-distributed unit, DU, and is configured with a semi-static multiplexing configuration allowing for simultaneous communications by the child IAB-MT and IAB-DU. The IAB node includes processing circuitry configured to: receive information associated with a determination of at least one multiplexing condition associated with a multiplexing capability where the multiplexing capability is associated at least with a capability of performing the simultaneous communications by the child IAB-MT and IAB-DU, and determine whether to adjust, at the IAB node, at least resource-usage according to the received information, as described herein.

According to one or more embodiments of this aspect, the multiplexing capability is a semi-static multiplexing capability associated with a plurality of semi-static resource multiplexing resource configurations. According to one or more embodiments of this aspect, the plurality of semi-static resource multiplexing resource configurations includes a first configuration and a second configuration different from the first configuration. The received information associated with the determined at least one dynamic multiplexing condition indicates the child IAB node is able to operate in a first multiplexing configuration different from second multiplexing configuration where the second multiplexing configuration is a current configuration. The first multiplexing configuration is one of a space division multiplexing, SDM, configuration, frequency division multiplexing, FDM, and a time division multiplexing, TDM, configuration.

According to one or more embodiments of this aspect, the received information is part of an information exchange between the IAB node and the child IAB node for determining whether at least one of the IAB node and the child IAB node can fulfill at least one of: a transmit power setting, a timing operation, and a transmission and reception mode. According to one or more embodiments of this aspect, the processing circuitry is further configured to cause transmission of signaling indicating the information was one of acknowledged, ACK, and negative acknowledged, NACK.

According to another aspect of the present disclosure, a method implemented by an integrated access and backhaul, IAB, node that is configured to communicate with a child IAB node is provided. The child IAB node includes a child IAB-mobile termination, MT, and a child IAB-distributed unit, DU, and is configured with a semi-static multiplexing configuration allowing for simultaneous communications by the child IAB-MT and IAB-DU. Information associated with a determination of at least one multiplexing condition associated with a multiplexing capability is received where the multiplexing capability associated at least with a capability of performing the simultaneous communications by the child IAB-MT and IAB-DU. A determination is made whether to adjust, at the IAB node, at least resource-usage according to the received information.

According to one or more embodiments of this aspect, the multiplexing capability is a semi-static multiplexing capability associated with a plurality of semi-static resource multiplexing resource configurations. According to one or more embodiments of this aspect, the plurality of semi-static resource multiplexing resource configurations includes a first configuration and a second configuration different from the first configuration. The received information associated with the determined at least one dynamic multiplexing condition indicates the child IAB node is able to operate in a first multiplexing configuration different from second multiplexing configuration where the second multiplexing configuration is a current configuration. The first multiplexing configuration is one of a space division multiplexing, SDM, configuration, frequency division multiplexing, FDM, and a time division multiplexing, TDM, configuration.

According to one or more embodiments of this aspect, the received information is part of an information exchange between the IAB node and the child IAB node for determining whether at least one of the IAB node and the child IAB node can fulfill at least one of a transmit power setting, a timing operation, and a transmission and reception mode. According to one or more embodiments of this aspect, transmission is caused of signaling indicating the information was one of acknowledged, ACK, and negative acknowledged, NACK.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
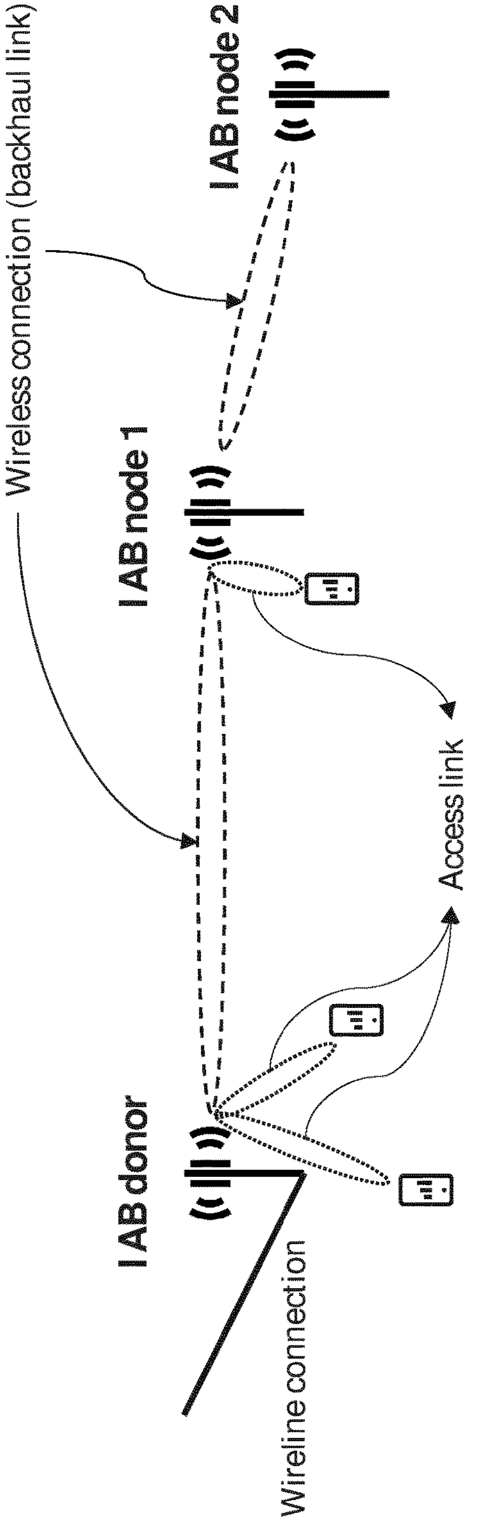
FIG. 1 is a diagram of a multi-hop deployment in an integrated access and backhaul (IAB) network.
Figure 2:
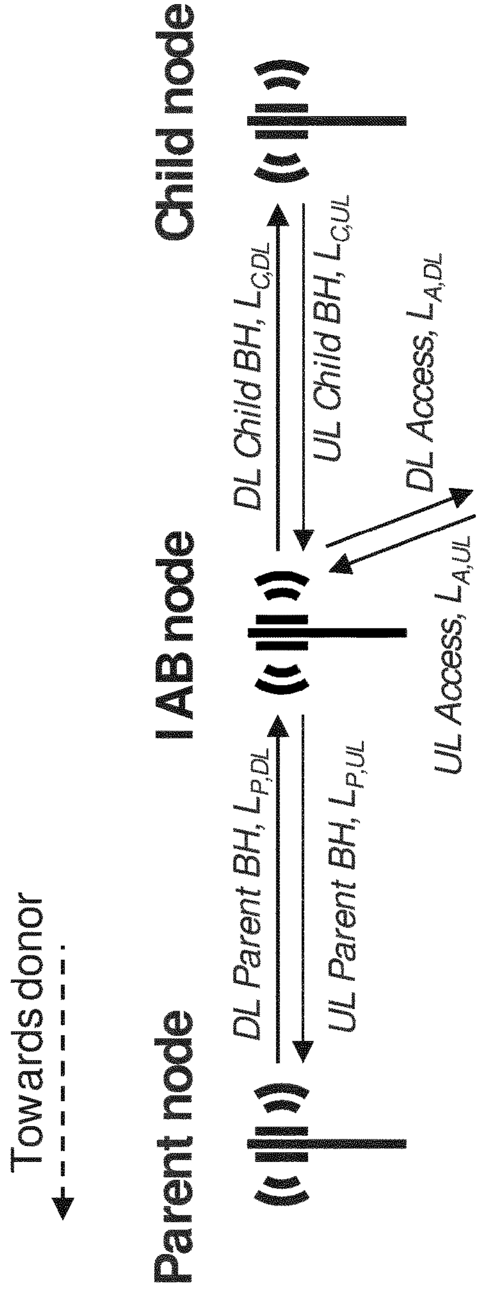
FIG. 2 is diagram of IAB terminologies in adjacent hops.
Figure 3:
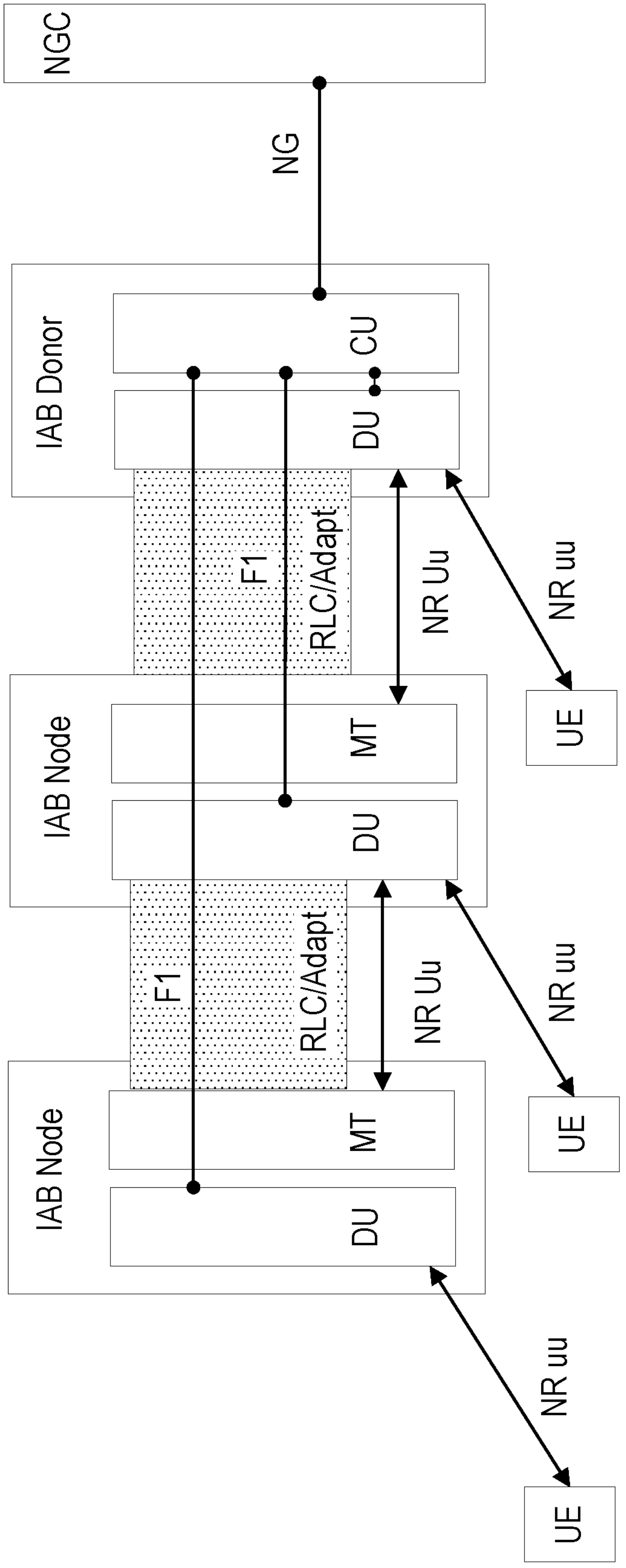
FIG. 3 is a diagram of an IAB architecture.
Figure 4:
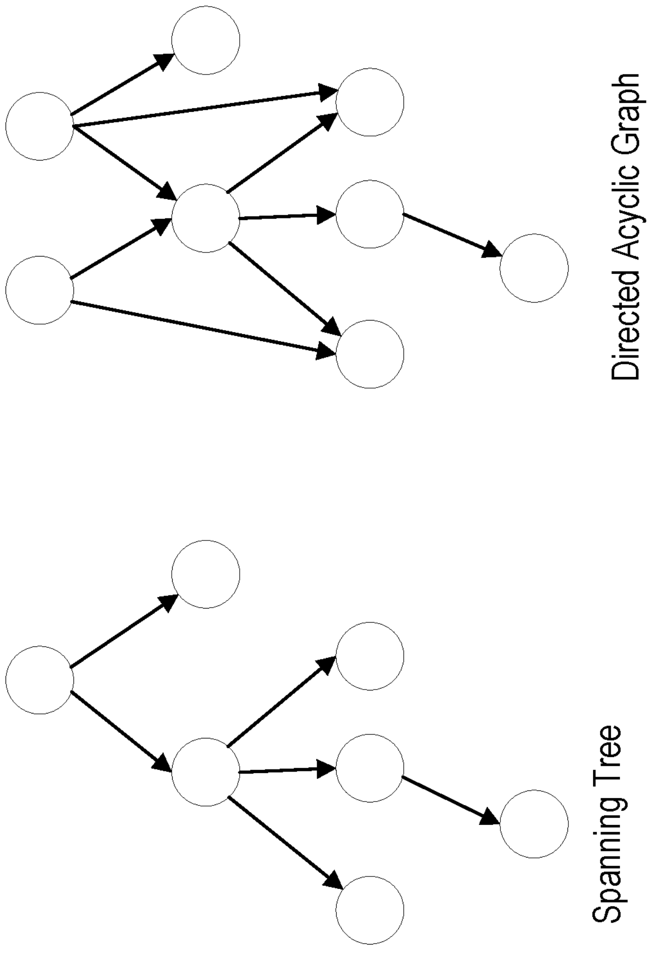
FIG. 4 is a diagram of examples for spanning tree and directed acyclic graph.
Figure 5:
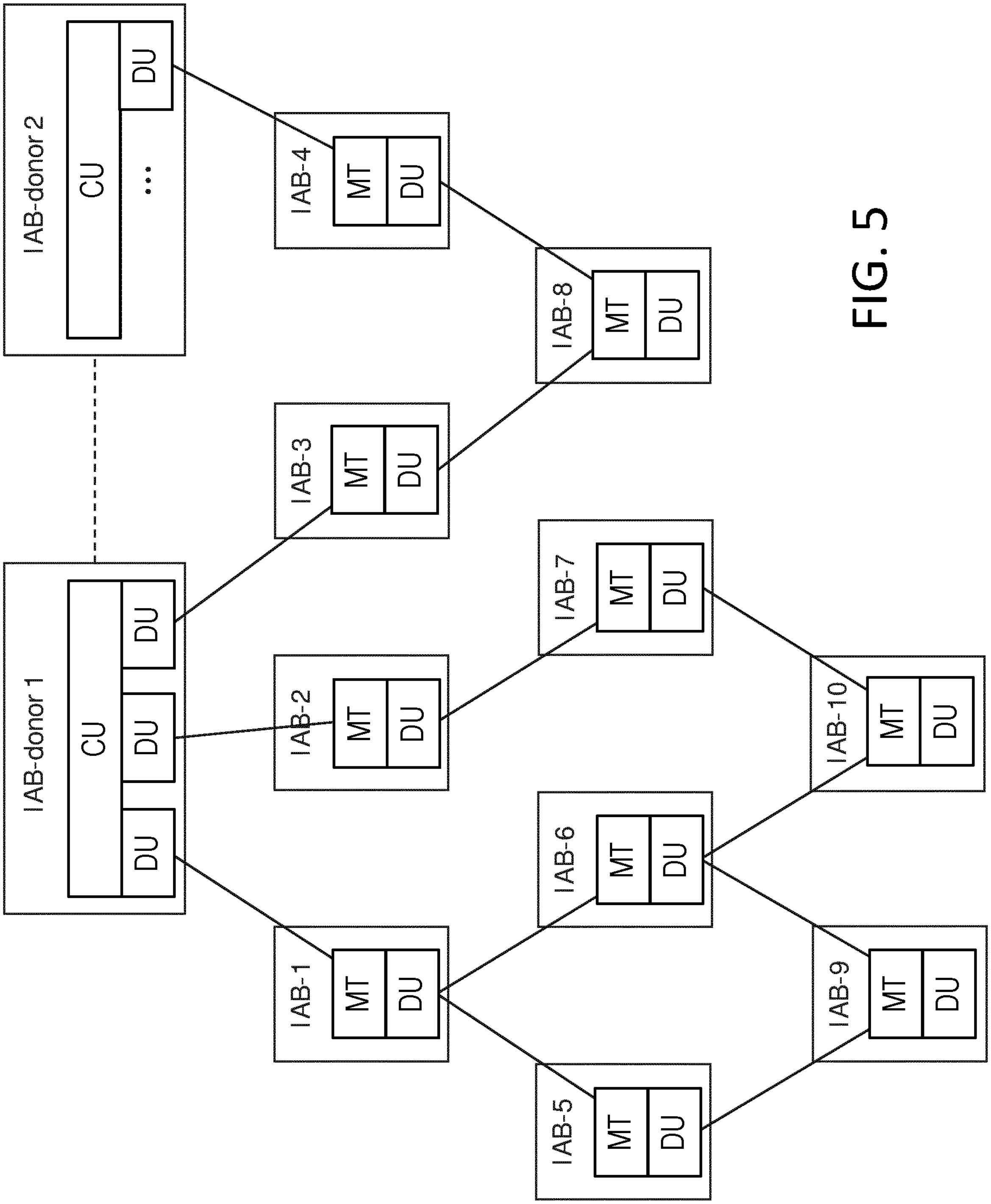
FIG. 5 is diagram of an IAB multi-parent scenarios.

Before describing in detail exemplary embodiments, it is noted that the embodiments reside primarily in combinations of apparatus components and processing steps related to dynamic multiplexing capability in an IAB node. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "IAB node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device or a radio network node.

In some embodiments, the non-limiting terms wireless device or a user equipment (UE) are used interchangeably. The wireless device herein can be any type of wireless device capable of communicating with a IAB node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a IAB node may be distributed over a plurality of wireless devices and/or IAB nodes. In other words, it is contemplated that the functions of the IAB node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide dynamic multiplexing capability in an IAB node.

Figure 6:
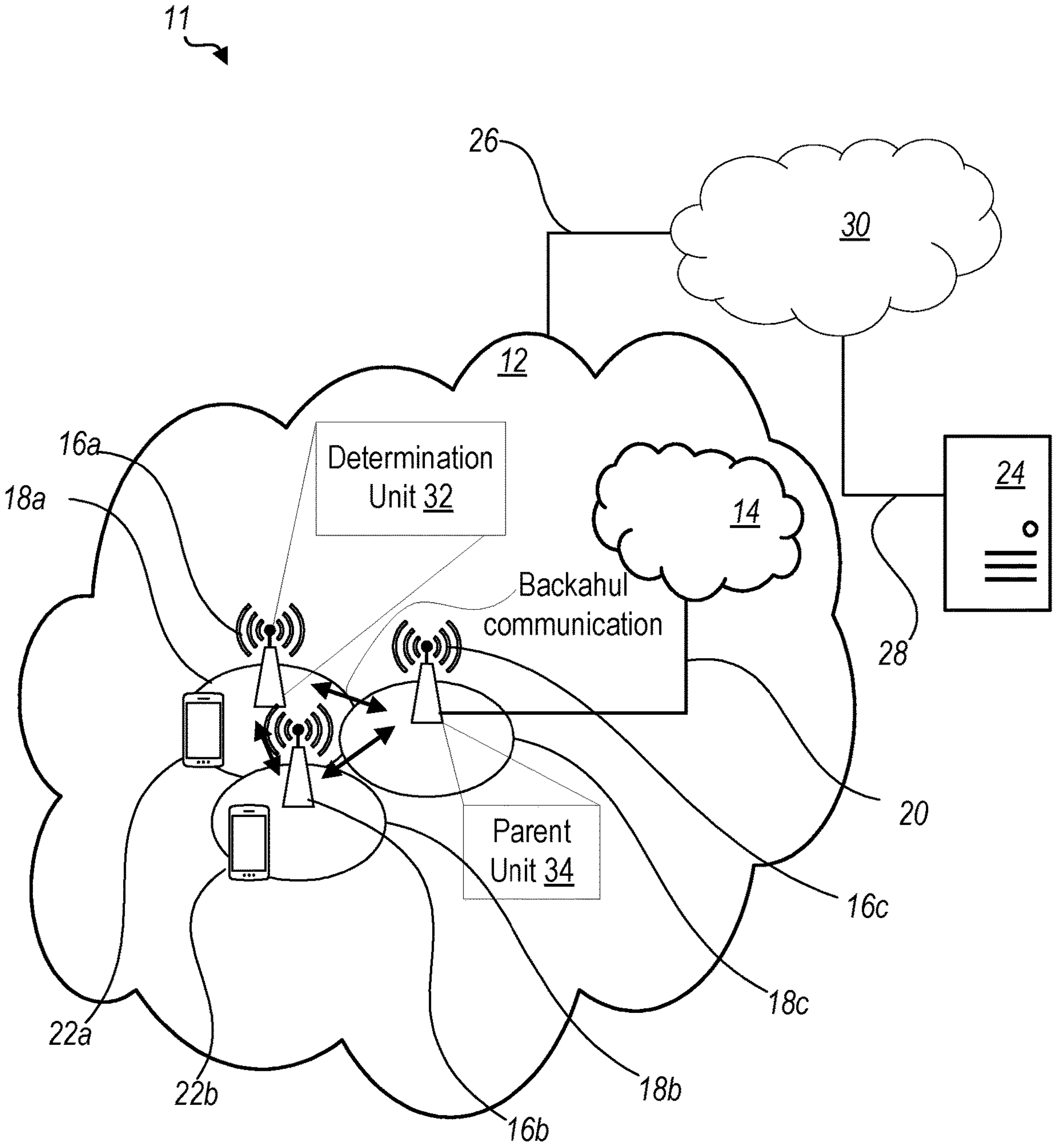
FIG. 6 is a schematic diagram of an example network architecture illustrating a communication system according to the principles in the present disclosure.

Referring now to the drawing figures, in which like elements are referred to by like reference numerals, there is shown in FIG. 6 a schematic diagram of a communication system 11, according to an embodiment, such as a 3GPP-type cellular network that may support standards such as LTE and/or NR (5G), which comprises an access network 12, such as a radio access network, and a core network 14. The access network 12 comprises a plurality of IAB nodes 16*a*, 16*b*, 16*c* (referred to collectively as IAB nodes 16), such as NBs, eNBs, gNBs or other types of wireless access points, each defining a corresponding coverage area 18*a*, 18*b*, 18*c* (referred to collectively as coverage areas 18). Each IAB node 16*a*, 16*b*, 16*c* is connectable to the core network 14 over a wired or wireless connection. In one or more embodiments, IAB node 16*a* is a parent IAB node 16*a* (referred to as parent IAB node 16) and IAB nodes 16*b-c* are child IAB nodes 16 (referred to as IAB nodes 16).

A first wireless device 22*a* located in coverage area 18*a* is configured to wirelessly connect to, or be paged by, the corresponding IAB node 16*a*. A second wireless device 22*b* in coverage area 18*b* is wirelessly connectable to the corresponding IAB node 16*b*. While a plurality of wireless devices 22*a*, 22*b* (collectively referred to as wireless devices 22) are illustrated in this example, the disclosed embodiments are equally applicable to a situation where a sole wireless device is in the coverage area or where a sole wireless device is connecting to the corresponding IAB node 16. Note that although only two wireless devices 22 and three IAB nodes 16 are shown for convenience, the communication system may include many more wireless devices 22 and IAB nodes 16.

Also, it is contemplated that a wireless device 22 can be in simultaneous communication and/or configured to separately communicate with more than one IAB node 16 and more than one type of IAB node 16. For example, a wireless device 22 can have dual connectivity with an IAB node 16 that supports LTE and the same or a different IAB node 16 that supports NR. As an example, wireless device 22 can be in communication with an eNB for LTE/E-UTRAN and a gNB for NR/NG-RAN.

An IAB node 16, e.g., child IAB node 16, is configured to include a determination unit 32 which is configured to perform one or more IAB node 16 functions as described herein such as with respect to dynamic multiplexing capability information. An IAB node 16, e.g., parent IAB node

16, is configured to include a parent unit 34 which is configured to perform one or more IAB node 16 functions as described herein such as with respect to dynamic multiplexing capability information.

Example implementations, in accordance with an embodiment, of the wireless device 22 and IAB nodes 16 discussed in the preceding paragraphs will now be described with reference to FIG. 7.

The communication system 11 includes an IAB node 16 provided in a communication system 11. IAB nodes 16 such as parent IAB node 16*a* and child IAB node 16*c* have similar hardware, software, etc. and are therefore discussed together below by reference to IAB node 16. IAB node 16 includes hardware 36 enabling it to communicate with other IAB nodes 16 and with the wireless device 22. The hardware 36 may include a communication interface 38 and/or radio interface 40 for setting up and maintaining a wired and/or wireless connection with an interface of another device in system 11 such as with another IAB node 16 and/or wireless device 22. The radio interface 40 may be formed as or may include, for example, one or more RF transmitters, one or more RF receivers, and/or one or more RF transceivers. The communication interface 38 may be configured to facilitate one or more connections.

In the embodiment shown, the hardware 36 of the IAB node 16 further includes processing circuitry 42. The processing circuitry 42 may include a processor 44 and a memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

In one or more embodiments, IAB node 16 includes mobile termination 45 (MT 45, also referred to as IAB-MT 45) and distributed unit 47 (DU 47, also referred to as IAB-DU 47), which are known in the art.

The IAB node 16 further has software 48 stored internally in, for example, memory 46, or stored in external memory (e.g., database, storage array, network storage device, etc.) accessible by the IAB node 16 via an external connection. The software 48 may be executable by the processing circuitry 42. The processing circuitry 42 may be configured to control any of the methods and/or processes described herein and/or to cause such methods, and/or processes to be performed, e.g., by IAB node 16. Processor 44 corresponds to one or more processors 44 for performing IAB node 16 functions described herein. The memory 46 is configured to store data, programmatic software code and/or other information described herein. In some embodiments, the software 48 may include instructions that, when executed by the processor 44 and/or processing circuitry 42, causes the processor 44 and/or processing circuitry 42 to perform the processes described herein with respect to IAB node 16. For example, processing circuitry 42 of the IAB node 16 (e.g., IAB node 16*c* acting as a child IAB node 16) may include determination unit 32 configured to perform one or more IAB node 16 functions as described herein such as with respect to a dynamic multiplexing capability. In another example, processing circuitry 42 of the IAB node 16 (e.g., IAB node 16*a* acting as a parent node) may include parent unit 34 configured to perform one or more IAB node 16 functions as described herein such as with respect to a dynamic multiplexing capability.

The communication system 11 further includes the wireless device 22 already referred to. The wireless device 22 may have hardware 49 that may include a radio interface 50 configured to set up and maintain a wireless connection with IAB node 16 serving a coverage area 18 in which the wireless device 22 is currently located. The radio interface 50 may be formed as or may include, for example, one or more RF transmitters, one or more RF receivers, and/or one or more RF transceivers.

The hardware 49 of the wireless device 22 further includes processing circuitry 52. The processing circuitry 52 may include a processor 54 and memory 56. In particular, in addition to or instead of a processor, such as a central processing unit, and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 54 may be configured to access (e.g., write to and/or read from) memory 56, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 58, which is stored in, for example, memory 56 at the wireless device 22, or stored in external memory (e.g., database, storage array, network storage device, etc.) accessible by the wireless device 22. The software 58 may be executable by the processing circuitry 52. The software 58 may include a client application 60. The client application 60 may be operable to provide a service to a human or non-human user via the wireless device 22. The client application 60 may interact with the user to generate the user data that it provides.

The processing circuitry 52 may be configured to control any of the methods and/or processes described herein and/or to cause such methods, and/or processes to be performed, e.g., by wireless device 22. The processor 54 corresponds to one or more processors 54 for performing wireless device 22 functions described herein. The wireless device 22 includes memory 56 that is configured to store data, programmatic software code and/or other information described herein. In some embodiments, the software 58 and/or the client application 60 may include instructions that, when executed by the processor 54 and/or processing circuitry 52, causes the processor 54 and/or processing circuitry 52 to perform the processes described herein with respect to wireless device 22.

Figure 7:
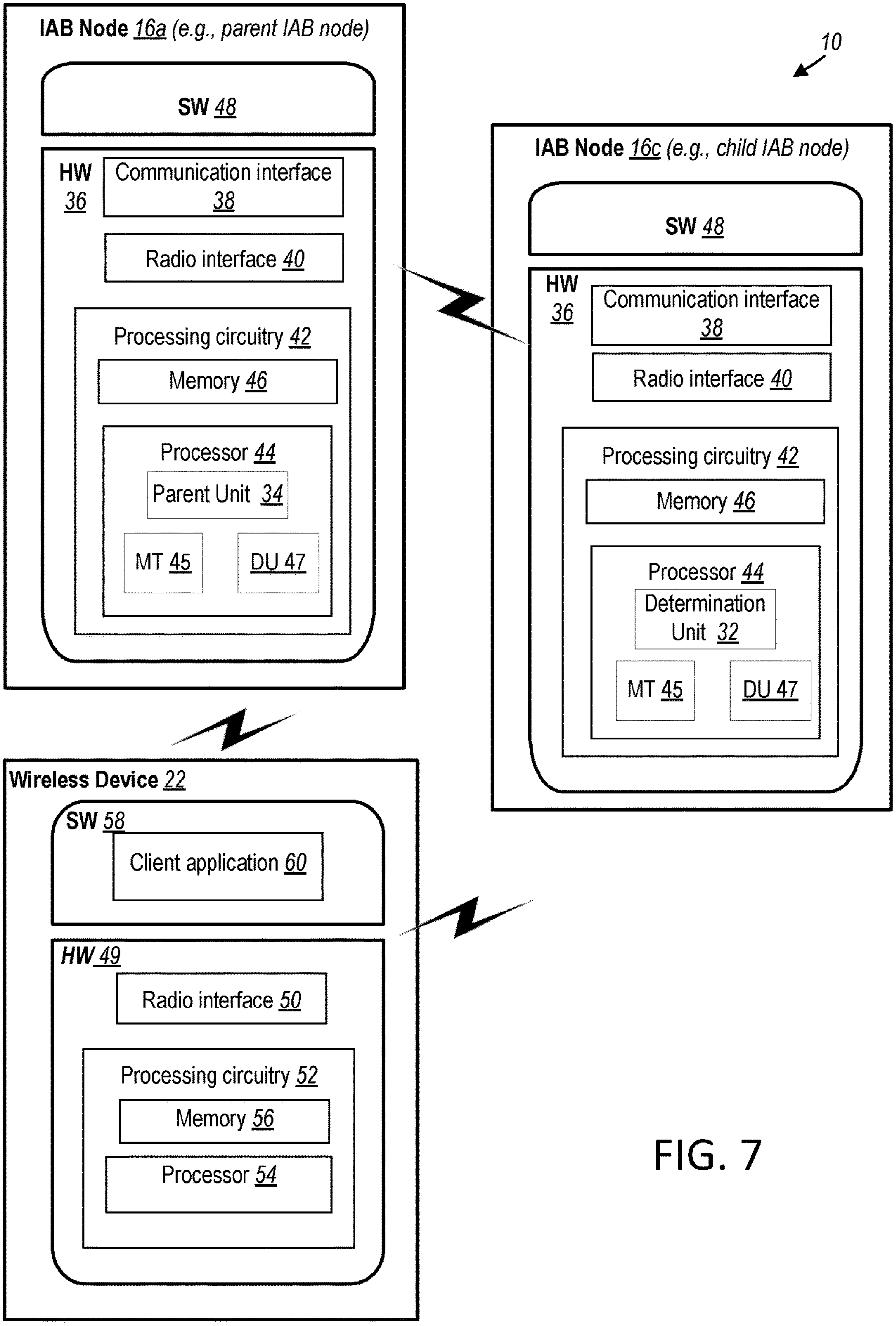
FIG. 7 is a block diagram of a portion of the system in FIG. 1 according to some embodiments of the present disclosure.

In some embodiments, the inner workings of IAB node 16 and wireless device 22 may be as shown in FIG. 7 and independently, the surrounding network topology may be that of FIG. 6. Although FIGS. 6 and 7 show various "units" such as determination unit 32, and parent unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 8:
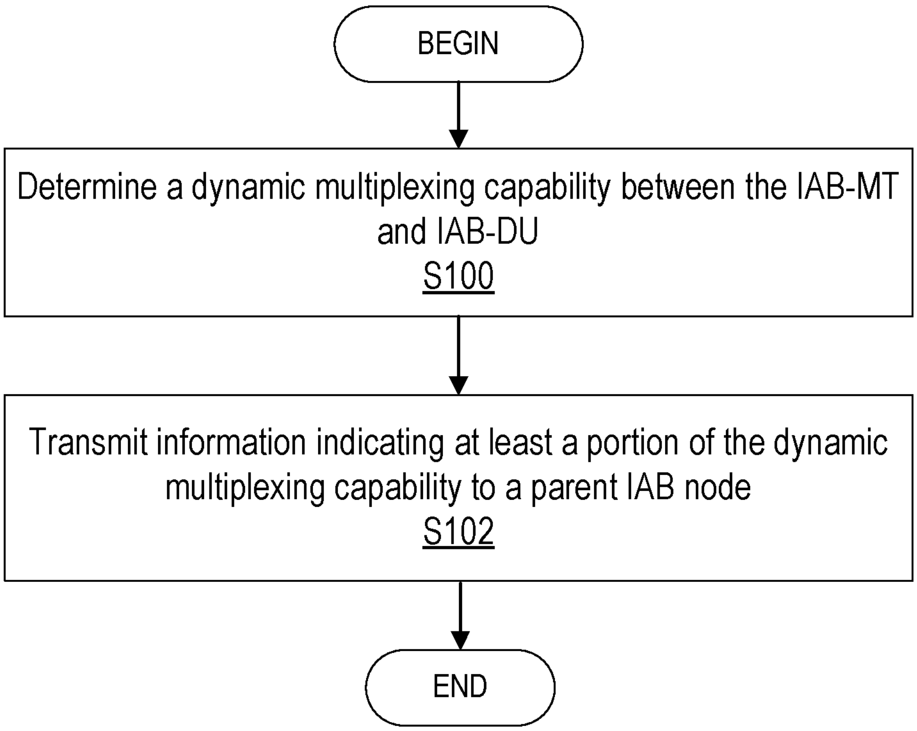
FIG. 8 is a flowchart of an example process in an IAB node according to some embodiments of the present disclosure.

FIG. 8 is a flowchart of an example process in IAB node 16 (e.g., child IAB node) according to some embodiments of the present disclosure. The IAB node 16 includes an IAB-mobile termination 45, MT 45, and an IAB-distributed unit 47, DU 47. One or more Blocks and/or functions performed by IAB node 16 may be performed by one or more elements of IAB node 16 such as by determination unit 32 in processing circuitry 42, processor 44, radio interface 40, etc. In one or more embodiments, IAB node 16 is configured to determine (Block S100) a dynamic multiplexing capability between the IAB-MT 45 and IAB-DU 47, as described herein. In one or more embodiments, IAB node 16 is configured to transmit (Block S102) information indicating at least a portion of the dynamic multiplexing capability to the parent IAB node 16, as described herein.

According to one or more embodiments, the IAB node is further configured to: determine semi-static multiplexing capability between the IAB-MT 45 and IAB-DU 47; transmit information associated with the semi-static multiplexing capability; compare the dynamic multiplexing capability with the semi-static multiplexing capability; and the indicated at least the portion of the dynamic multiplexing capability being based on the comparison and indicating at least information different from the semi-static multiplexing capability.

According to one or more embodiments, the dynamic multiplexing capability is associated at least one of: time division multiplexing, TDM; frequency division multiplexing, FDM; space division multiplexing, SDM; capability of simultaneous transmission by the IAB-MT 45 and IAB-DU 47; capability of simultaneous reception by the IAB-MT 45 and IAB-DU 47; capability of simultaneous transmission by the IAB-MT 45 and simultaneous reception by the IAB-DU 47; capability of simultaneous reception by the IAB-MT 45 and simultaneous transmission by the IAB-DU 47; and incapability of simultaneous operation.

Figure 9:
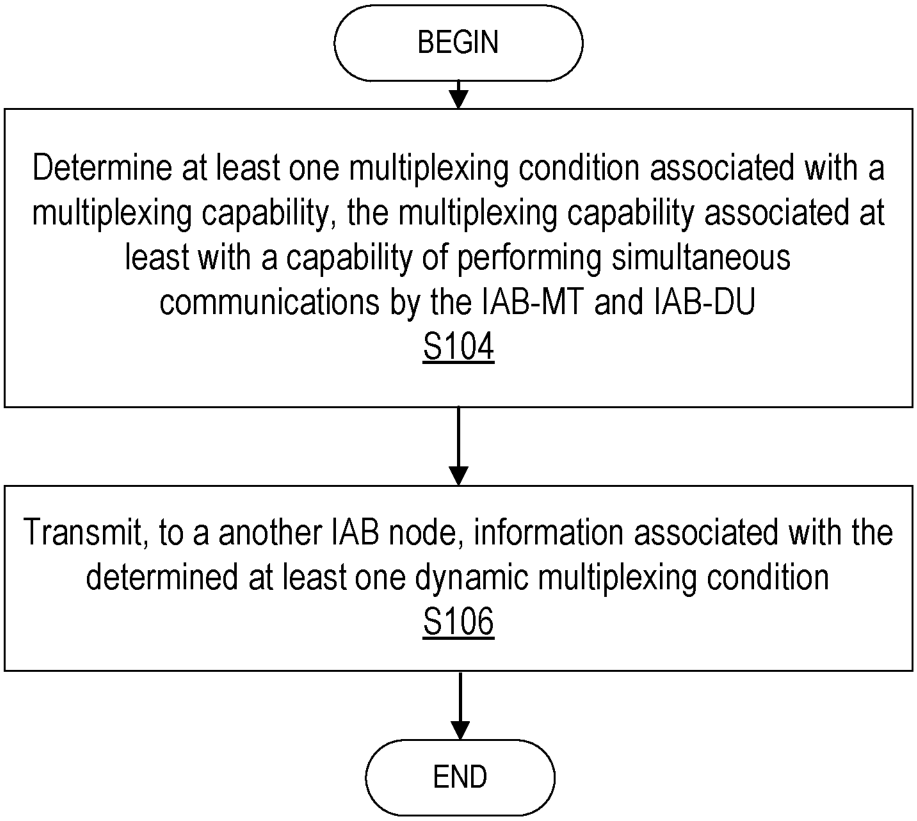
FIG. 9 is a flowchart of another example process in an IAB node according to some embodiments of the present disclosure.

FIG. 9 is a flowchart of an example process in IAB node 16 (e.g., child IAB node) according to some embodiments of the present disclosure. The IAB node 16 includes an IAB-mobile termination 45, MT 45, and an IAB-distributed unit 47, DU 47. One or more Blocks and/or functions performed by IAB node 16 may be performed by one or more elements of IAB node 16 such as by determination unit 32 in processing circuitry 42, processor 44, radio interface 40, etc. In one or more embodiments, IAB node 16 is configured to determine (Block S104) at least one multiplexing condition associated with a multiplexing capability where the multiplexing capability associated at least with a capability of performing simultaneous communications by the IAB-MT and IAB-DU, as described herein. In one or more embodiments, the IAB node 16 is configured to transmit (Block S106), to a another IAB node, information associated with the determined at least one dynamic multiplexing condition.

According to one or more embodiments, the multiplexing capability is a semi-static multiplexing capability associated with a plurality of semi-static resource multiplexing resource configurations. According to one or more embodiments, the plurality of semi-static resource multiplexing resource configurations includes a first configuration and a second configuration different from the first configuration where the information associated with the determined at least one multiplexing condition indicates the IAB node 16 is able to operate in a first multiplexing configuration different from second multiplexing configuration, and where the second multiplexing configuration is a current configuration. According to one or more embodiments, the first multiplexing configuration is one of a space division multiplexing, SDM, configuration, frequency division multiplexing, FDM, and a time division multiplexing, TDM, configuration.

According to one or more embodiments, the processing circuitry 42 is further configured to receive signaling indicating the information was one of acknowledged, ACK, and negative acknowledged, NACK. According to one or more embodiments, the determination of the at least one multiplexing condition associated with the multiplexing capability is one of conducted periodically and triggered by at least one predefined event where the at least one predefined event including at least one of: a change in at least one of transmission timing and receiving timing, a data rate change, and a signal-to-noise ratio change. According to one or more embodiments, the information is part of an information exchange between the IAB node 16 and the other IAB node 16 for determining whether at least one of the IAB node 16 and the other IAB node 16 can fulfill at least one of: a transmit power setting, a timing operation, and a transmission and reception mode.

According to one or more embodiments, the processing circuitry 42 is further configured to: compare the at least one multiplexing condition associated with the multiplexing capability with a plurality of semi-static resource multiplexing resource configurations, and the information associated with the determined at least one multiplexing condition is based on the comparison and indicating a current multiplexing capability is different from a current semi-static multiplexing configuration. According to one or more embodiments, the other IAB node 16 is a parent IAB node 16.

Figure 10:
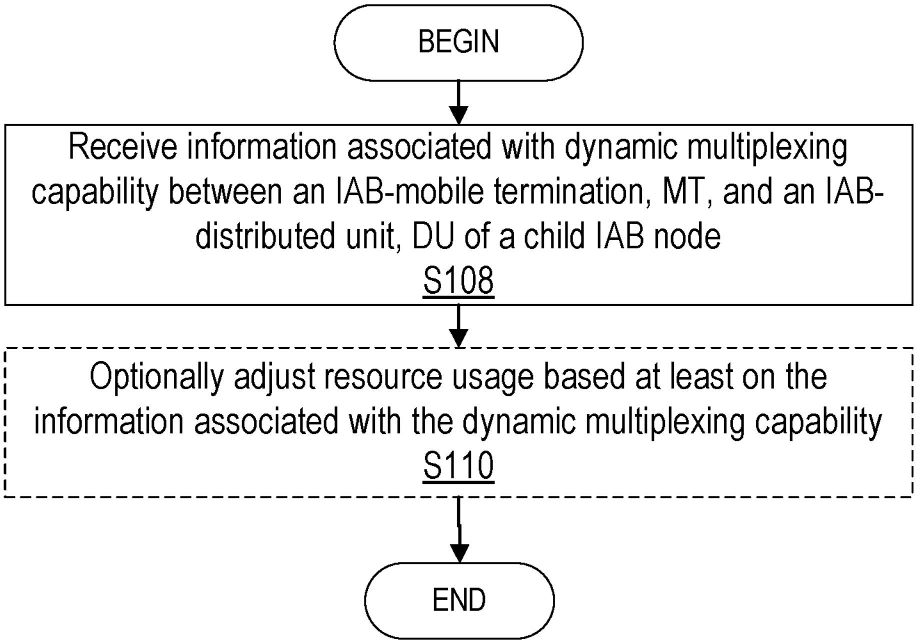
FIG. 10 is a flowchart of yet another example process in an IAB node according to some embodiments of the present disclosure.

FIG. 10 is a flowchart of another example process in IAB node 16 (e.g., parent IAB node) according to some embodiments of the present disclosure. The IAB node 16 may include an IAB-mobile termination, MT 45, and an IAB-distributed unit, DU 47. One or more Blocks and/or functions performed by IAB node 16 may be performed by one or more elements of IAB node 16 such as by determination unit 32 in processing circuitry 42, processor 44, radio interface 40, etc. In one or more embodiments, IAB node 16 is configured to receive (Block S108) information associated with dynamic multiplexing capability between an IAB-mobile termination 45, MT 45, and an IAB-distributed unit 47, DU 47 of a child IAB node 16, as described herein. In one or more embodiments, IAB node 16 is configured to optionally adjust (Block S110) resource usage based at least on the information associated with the dynamic multiplexing capability, as described herein.

According to one or more embodiments, the IAB node 16 is configured to: receive information associated with semi-static multiplexing capability between the IAB-MT 45 and IAB-DU 47 where the information is associated with the dynamic multiplexing capability indicating at least information different from the semi-static multiplexing capability. According to one or more embodiments, the information associated with dynamic multiplexing capability is associated at least one of: time division multiplexing, TDM; frequency division multiplexing, FDM; space division multiplexing, SDM; capability of simultaneous transmission by the IAB-MT 45 and IAB-DU 47; capability of simultaneous reception by the IAB-MT 45 and IAB-DU 47; capability of simultaneous transmission by the IAB-MT 45 and simultaneous reception by the IAB-DU 47; capability of simultaneous reception by the IAB-MT 45 and simultaneous transmission by the IAB-DU 47; and incapability of simultaneous operation.

Figure 11:
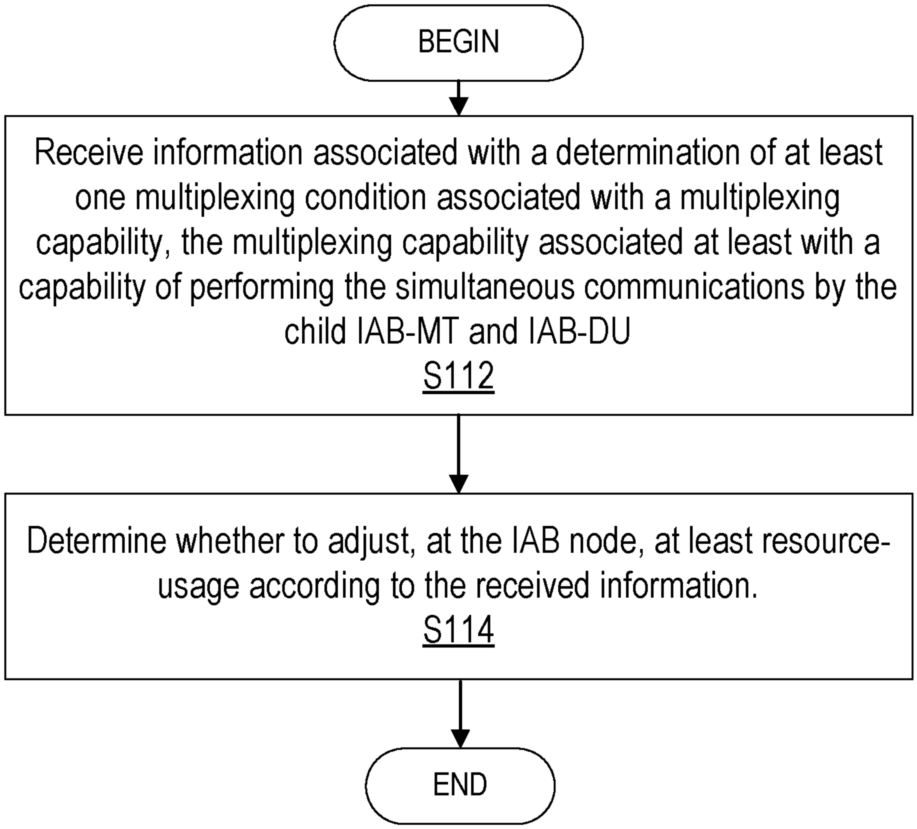
FIG. 11 is a flowchart of yet another example process in an IAB node according to some embodiments of the present disclosure.

FIG. 11 is a flowchart of another example process in IAB node 16 (e.g., parent IAB node) according to some embodiments of the present disclosure. The IAB node 16 may include an IAB-mobile termination, MT 45, and an IAB-distributed unit, DU 47. One or more Blocks and/or functions performed by IAB node 16 may be performed by one or more elements of IAB node 16 such as by determination unit 32 in processing circuitry 42, processor 44, radio interface 40, etc. In one or more embodiments, IAB node 16 is configured to receive (Block S112) information associated with a determination of at least one multiplexing condition associated with a multiplexing capability where the multiplexing capability is associated at least with a capability of performing the simultaneous communications by the child IAB-MT 45 and IAB-DU 47, as described herein. The IAB node 16 is configured to determine (Block S114) whether to adjust, at the IAB node 16, at least resource-usage according to the received information, as described herein.

According to one or more embodiments, the multiplexing capability is a semi-static multiplexing capability associated with a plurality of semi-static resource multiplexing resource configurations. According to one or more embodiments, the plurality of semi-static resource multiplexing resource configurations includes a first configuration and a second configuration different from the first configuration where the received information associated with the determined at least one dynamic multiplexing condition indicates the child IAB node 16 is able to operate in a first multiplexing configuration different from second multiplexing configuration, and where the second multiplexing configuration is a current configuration. The first multiplexing configuration is one of a space division multiplexing, SDM, configuration, frequency division multiplexing, FDM, and a time division multiplexing, TDM, configuration.

According to one or more embodiments, the received information is part of an information exchange between the IAB node 16 and the child IAB node 16 for determining whether at least one of the IAB node 16 and the child IAB node 16 can fulfill at least one of: a transmit power setting, a timing operation, and a transmission and reception mode. According to one or more embodiments, the processing circuitry 42 is further configured to cause transmission of signaling indicating the information was one of acknowledged, ACK, and negative acknowledged, NACK.

Having generally described arrangements associated with dynamic multiplexing capability, details for these arrangements, functions and processes are provided as follows, and which may be implemented by the IAB node 16 and/or wireless device 22. In particular, one or more IAB node 16 functions described below may be performed by one or more of processing circuitry 42, processor 44, MT 45, DU 47, determination unit 32, parent unit 34, etc. Embodiments are associated with dynamic multiplexing capability.

Example Methods at the IAB Node 16 (e.g., Child IAB Node 16)

In one or more embodiments, an IAB node 16 including (at least) an IAB-MT 45 and (at least) an IAB-DU 47: is configured to:

- Determine its multiplexing capability between the IAB-MT 45 and IAB-DU 47 of the child IAB node 16;
  - The multiplexing capability can be in terms of one or more of:
    - time-division multiplexing (TDM);
    - frequency-division multiplexing (FDM); and
    - space-division multiplexing (SDM).
  - Or, the multiplexing capability can be in terms of one or more of:
    - capable of simultaneous transmission (TX) of the IAB-MT 45 and IAB-DU 47;
    - capable of simultaneous reception (RX) of the IAB-MT 45 and IAB-DU 47;
    - capable of simultaneous TX and RX of the IAB-MT 45 and IAB-DU 47, respectively;
    - capable of simultaneous RX and TX of the IAB-MT 45 and IAB-DU 47, respectively; and
    - incapable of any simultaneous operation.
  - Or, the multiplexing capability can be in terms of:
    - TDM required; or
    - TDM not required.
  - The determination may include information exchange between the IAB node 16 and the IAB node(s) 16 (parent IAB node 16), and/or between the IAB node 16 and other IAB node(s) 16 (child IAB nodes 16). For example, information regarding whether the parent IAB-DU 47 and or the child IAB-MT 45 can fulfill certain transmit power setting, certain transmit/receive timing operation, or certain transmission/reception mode, is exchanged.
  - The determination is conducted periodically; or
  - The determination is triggered by one or more predefined events, such as the change of transmit/receive timing to/from the IAB node(s) 16 such as parent IAB node(s) 16 and/or other IAB node(s) 16 such as child IAB node(s) 16, noticeable data rate change on certain backhaul/access link(s), measured signal-to-noise power ratio (SINR) change beyond certain threshold, etc.
  - If the IAB node 16 (e.g., child IAB node 16) include more than one IAB-MT 45 and/or more than one IAB-DU 47, the determination is performed between each pair of the active IAB-MT 45 and IAB-DU 47, where, in one or more embodiments, "active" IAB-MT 45 means the IAB-MT 45 serves at least one parent backhaul link, and "active" IAB-DU 47 means the IAB-DU 47 serves at least one child backhaul link or access link.
  - The determination may be performed for any {MT 45 CC, DU 47 cell} pair of an IAB-MT 45 and an IAB-DU 47.
- Compare the multiplexing capability with the associated information that has already been indicated to the network function unit (e.g., the IAB-donor-CU), such as with semi-static multiplexing capability information;
- Send/transmit the information of multiplexing capability to the IAB node 16 such as to parent IAB node 16;
  - In one or more embodiments, the information is only sent when a change in multiplexing capability has been notified; or
  - In one or more embodiments, the information is updated periodically to the IAB node 16 such as parent IAB node 16;
  - If the IAB node 16 (e.g., child IAB node 16) connects to more than one IAB node 16 such as more than one parent IAB node 16, individual information of multiplexing capability may be sent to each of the parent IAB nodes 16.
- (optionally) in one or more embodiments, send/transmit the information of multiplexing-capability, which is different from the previously provided multiplexing capability, also to the network function unit (e.g., the IAB-donor-CU) which is responsible for semi-static resource configuration;
  - The change is sent to the network function unit if the multiplexing-capability change has been perceived longer than a certain period of time; or The change is sent to the network function unit if the current multiplexing capability has a better resource usage than the previously provided one, e.g., the capability has changed from TDM to FDM, or from TDM to SDM, or from FDM to SDM.

(optionally) in one or more embodiments, receive ACK/NACK from an IAB node 16 such as a parent IAB node 16, about the information regarding multiplexing capability of the IAB node 16 (e.g., child IAB node 16). In one or more embodiments, ACK/NACK is used to indicate whether at least resource-usage has been adjusted based on the information.

Example Methods at the IAB Node 16 (e.g., Parent IAB Node 16)

The IAB node 16 such as parent IAB node 16 is configured to:

receive the information about multiplexing capability of the IAB node 16 (e.g., child IAB node 16);

(optionally) in one or more embodiments, adjust scheduling/resource-usage on the parent backhaul link according to the received information about multiplexing capability of the IAB node 16 (e.g., child IAB node 16);

(optionally) in one or more embodiments, send ACK/NACK to and/or associated with the information about multiplexing capability of the IAB node 16 (e.g., child IAB node 16) such that the ACK/NACK indicates whether the parent IAB node 16 is changing the multiplexing configuration.

SOME EXAMPLES

Example A1. An integrated access and backhaul, IAB, node 16 (e.g., child IAB node) including an IAB-mobile termination, MT 45, and an IAB-distributed unit, DU 47, the IAB node 16 having processing circuitry 42 and/or a radio interface 40, the IAB node 16 and/or processing circuitry 42 and/or a radio interface 40 configured to:

determine a dynamic multiplexing capability between the IAB-MT 45 and IAB-DU 47; and transmit information indicating at least a portion of the dynamic multiplexing capability to a parent IAB node 16.

Example A2. The IAB node 16 of Example A1, wherein the processing circuitry 42 and/or the radio interface 40 and/or IAB node 16 is further configured to:

determine semi-static multiplexing capability between the IAB-MT 45 and IAB-DU 47;

transmit information associated with the semi-static multiplexing capability;

compare the dynamic multiplexing capability with the semi-static multiplexing capability; and the indicated at least the portion of the dynamic multiplexing capability being based on the comparison and indicating at least information different from the semi-static multiplexing capability.

Example A3. The IAB node 16 of Example A1, wherein the dynamic multiplexing capability is associated at least one of:

time division multiplexing, TDM;

frequency division multiplexing, FDM;

space division multiplexing, SDM;

capability of simultaneous transmission by the IAB-MT 45 and IAB-DU 47;

capability of simultaneous reception by the IAB-MT 45 and IAB-DU 47;

capability of simultaneous transmission by the IAB-MT 45 and simultaneous reception by the IAB-DU 47;

capability of simultaneous reception by the IAB-MT 45 and simultaneous transmission by the IAB-DU 47; and incapability of simultaneous operation.

Example B1. A method for an integrated access and backhaul, IAB, node 16 (e.g., child IAB node) including an IAB-mobile termination, MT 45, and an IAB-distributed unit, DU 47, the method comprising:

determining a dynamic multiplexing capability between the IAB-MT 45 and IAB-DU 47; and transmitting information indicating at least a portion of the dynamic multiplexing capability to a parent IAB node 16.

Example B2. The method of Example B1, further comprising:

determining semi-static multiplexing capability between the IAB-MT 45 and IAB-DU 47;

transmitting information associated with the semi-static multiplexing capability;

comparing the dynamic multiplexing capability with the semi-static multiplexing capability; and the indicated at least the portion of the dynamic multiplexing capability being based on the comparison and indicating at least information different from the semi-static multiplexing capability.

Example B3. The method of Example B1, wherein the dynamic multiplexing capability is associated at least one of:

time division multiplexing, TDM;

frequency division multiplexing, FDM;

space division multiplexing, SDM;

capability of simultaneous transmission by the IAB-MT 45 and IAB-DU 47;

capability of simultaneous reception by the IAB-MT 45 and IAB-DU 47;

capability of simultaneous transmission by the IAB-MT 45 and simultaneous reception by the IAB-DU 47;

capability of simultaneous reception by the IAB-MT 45 and simultaneous transmission by the IAB-DU 47; and incapability of simultaneous operation.

Example C1. An integrated and access backhaul, IAB, node 16 (e.g., parent IAB node) having processing circuitry 42 and/or a radio interface 40, the IAB node 16 and/or processing circuitry 42 and/or a radio interface 40 configured to:

receive information associated with dynamic multiplexing capability between an IAB-mobile termination, MT 45, and an IAB-distributed unit, DU 47, of a child IAB node 16; and optionally adjust resource usage based at least on the information associated with the dynamic multiplexing capability.

Example C2. The IAB node 16 of Example C1, wherein the IAB node 16 and/or processing circuitry 42 and/or the radio interface 40 is configured to:

receive information associated with semi-static multiplexing capability between the IAB-MT 45 and IAB-DU 47; and the information associated with the dynamic multiplexing capability indicating at least information different from the semi-static multiplexing capability.

Example C3. The IAB node 16 of Example C1, wherein the information associated with dynamic multiplexing capability is associated at least one of:

time division multiplexing, TDM;

frequency division multiplexing, FDM;

space division multiplexing, SDM;

capability of simultaneous transmission by the IAB-MT 45 and IAB-DU 47;

capability of simultaneous reception by the IAB-MT 45 and IAB-DU 47;

capability of simultaneous transmission by the IAB-MT 45 and simultaneous reception by the IAB-DU 47;

capability of simultaneous reception by the IAB-MT 45 and simultaneous transmission by the IAB-DU 47; and incapability of simultaneous operation.

Example D1. A method for an integrated and access backhaul, IAB, node 16 (e.g., parent IAB node) comprising:

receiving information associated with dynamic multiplexing capability between an IAB-mobile termination, MT 45, and an IAB-distributed unit, DU 47, of a child IAB node 16; and optionally adjusting resource usage based at least on the information associated with the dynamic multiplexing capability.

Example D2. The method of Example D1, further comprising receiving information associated with semi-static multiplexing capability between the IAB-MT and IAB-DU 47; and the information associated with the dynamic multiplexing capability indicating at least information different from the semi-static multiplexing capability.

Example D3. The method of Example D1, wherein the information associated with dynamic multiplexing capability is associated at least one of:

time division multiplexing, TDM;

frequency division multiplexing, FDM;

space division multiplexing, SDM;

capability of simultaneous transmission by the IAB-MT 45 and IAB-DU 47;

capability of simultaneous reception by the IAB-MT 45 and IAB-DU;

capability of simultaneous transmission by the IAB-MT 45 and simultaneous reception by the IAB-DU 47;

capability of simultaneous reception by the IAB-MT 45 and simultaneous transmission by the IAB-DU 47; and incapability of simultaneous operation.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. An integrated access and backhaul (IAB) node comprising an IAB-mobile termination (IAB-MT) an IAB-distributed unit (IAB-DU) and processing circuitry, the processing circuitry configured to:

determine at least one dynamic multiplexing condition associated with a multiplexing capability, the multiplexing condition comprising a condition for determining whether a change in multiplexing capability is available, the multiplexing capability associated at least with a capability of performing simultaneous communications by the IAB-MT and the IAB-DU; and transmit, to another IAB node, information associated with the determined at least one dynamic multiplexing condition.

2. The IAB node of claim 1, wherein the multiplexing capability is a semi-static multiplexing capability associated with a plurality of semi-static resource multiplexing resource configurations;

wherein the plurality of semi-static resource multiplexing resource configurations includes a first configuration and a second configuration different from the first configuration; and the information associated with the determined at least one multiplexing condition indicating the IAB node is able to operate in a first multiplexing configuration different from second multiplexing configuration, the second multiplexing configuration being a current configuration.

3. The IAB node of claim 2, wherein the first multiplexing configuration is one of a space division multiplexing (SDM) configuration, frequency division multiplexing (FDM) and a time division multiplexing (TDM) configuration.

4. The IAB node of claim 1, wherein the processing circuitry is further configured to receive signaling indicating the information was one of acknowledged (ACK) and negative acknowledged (NACK).

5. The IAB node of claim 1, wherein the determination of the at least one multiplexing condition associated with the multiplexing capability is one of conducted periodically and triggered by at least one predefined event, the at least one predefined event including at least one of:

a change in at least one of transmission timing and receiving timing;

a data rate change; and a signal-to-noise ratio change.

6. The IAB node of claim 1, wherein the information is part of an information exchange between the IAB node and the other IAB node for determining whether at least one of the IAB node and the other IAB node can fulfill at least one of:

a transmit power setting;

a timing operation; and a transmission and reception mode.

7. The IAB node of claim 1, wherein the processing circuitry is further configured to:

compare the at least one multiplexing condition associated with the multiplexing capability with a plurality of semi-static resource multiplexing resource configurations; and the information associated with the determined at least one multiplexing condition being based on the comparison and indicating a current multiplexing capability is different from a current semi-static multiplexing configuration.

8. The IAB node of claim 1, wherein the other IAB node is a parent IAB node.

9. A method implemented by an integrated access and backhaul (IAB) node including an IAB-mobile termination (IAB-MT) and an IAB-distributed unit (IAB-DU) method comprising:

determining at least one dynamic multiplexing condition associated with a multiplexing capability, the multiplexing condition comprising a condition for determining whether a change in multiplexing capability is available, the multiplexing capability associated at least with a capability of performing simultaneous communications by the IAB-MT and the IAB-DU; and transmitting, to another IAB node, information associated with the determined at least one dynamic multiplexing condition.

10. The method of claim 9, wherein the multiplexing capability is a semi-static multiplexing capability associated with a plurality of semi-static resource multiplexing resource configurations;

wherein the plurality of semi-static resource multiplexing resource configurations includes a first configuration and a second configuration different from the first configuration; and the information associated with the determined at least one multiplexing condition indicating the IAB node is able to operate in a first multiplexing configuration different from second multiplexing configuration, the second multiplexing configuration being a current configuration.

11. The method of claim 10, wherein the first multiplexing configuration is one of a space division multiplexing (SDM) configuration, frequency division multiplexing (FDM) and a time division multiplexing (TDM) configuration.

12. The method of claim 9, further comprising receiving signaling indicating the information was one of acknowledged (ACK) and negative acknowledged (NACK).

13. The method of claim 9, wherein the determination of the at least one multiplexing condition associated with the multiplexing capability is one of conducted periodically and triggered by at least one predefined event, the at least one predefined event including at least one of:

a change in at least one of transmission timing and receiving timing;

a data rate change; and a signal-to-noise ratio change.

14. The method of claim 9, wherein the information is part of an information exchange between the IAB node and the other IAB node for determining whether at least one of the IAB node and the other IAB node can fulfill at least one of:

a transmit power setting;

a timing operation; and a transmission and reception mode.

15. The method of claim 9, further comprising:

comparing the at least one multiplexing condition associated with the multiplexing capability with a plurality of semi-static resource multiplexing resource configurations; and the information associated with the determined at least one multiplexing condition being based on the comparison and indicating a current multiplexing capability is different from a current semi-static multiplexing configuration.

16. The method of claim 9, wherein the other IAB node is a parent IAB node.

17. An integrated access and backhaul (IAB) node that is configured to communicate with a child IAB node, the child IAB node including a child IAB-mobile termination (IAB-MT) and a child IAB-distributed unit (IAB-DU) and being configured with a semi-static multiplexing configuration allowing for simultaneous communications by the child IAB-MT and the child IAB-DU, the IAB node comprising:

processing circuitry configured to:

receive information associated with a determination of at least one multiplexing condition associated with a multiplexing capability, the multiplexing capability associated at least with a capability of performing the simultaneous communications by the child IAB-MT and the child IAB-DU; and determine whether to adjust, at the IAB node, at least resource-usage according to the received information.

18. The IAB node of claim 17, wherein the multiplexing capability is a semi-static multiplexing capability associated with a plurality of semi-static resource multiplexing resource configurations;

wherein the plurality of semi-static resource multiplexing resource configurations includes a first configuration and a second configuration different from the first configuration;

the received information associated with the determined at least one dynamic multiplexing condition indicating the child IAB node is able to operate in a first multiplexing configuration different from second multiplexing configuration, the second multiplexing configuration being a current configuration; and the first multiplexing configuration is one of a space division multiplexing (SDM) configuration, frequency division multiplexing (FDM) and a time division multiplexing (TDM) configuration.

19. The IAB node of claim 17, wherein the received information is part of an information exchange between the IAB node and the child IAB node for determining whether at least one of the IAB node and the child IAB node can fulfill at least one of:

a transmit power setting;

a timing operation; and a transmission and reception mode.

20. The IAB node of claim 17, wherein the processing circuitry is further configured to cause transmission of signaling indicating the information was one of acknowledged (ACK) and negative acknowledged (NACK).

21. A method implemented by an integrated access and backhaul (IAB) node that is configured to communicate with a child IAB node, the child IAB node including a child IAB-mobile termination (IAB-MT) and a child IAB-distributed unit IAB-DU) and being configured with a semi-static multiplexing configuration allowing for simultaneous communications by the child IAB-MT and the child IAB-DU, the method comprising:

receiving information associated with a determination of at least one multiplexing condition associated with a multiplexing capability, the multiplexing capability associated at least with a capability of performing the simultaneous communications by the child IAB-MT and IAB-DU; and determining whether to adjust, at the IAB node, at least resource-usage according to the received information.

22. The method of claim 21, wherein the multiplexing capability is a semi-static multiplexing capability associated with a plurality of semi-static resource multiplexing resource configurations;

wherein the plurality of semi-static resource multiplexing resource configurations includes a first configuration and a second configuration different from the first configuration;

the received information associated with the determined at least one dynamic multiplexing condition indicating the child IAB node is able to operate in a first multiplexing configuration different from second multiplexing configuration, the second multiplexing configuration being a current configuration; and the first multiplexing configuration is one of a space division multiplexing (SDM) configuration, frequency division multiplexing (FDM) and a time division multiplexing (TDM) configuration.

23. The method of claim 21, wherein the received information is part of an information exchange between the IAB node and the child IAB node for determining whether at least one of the IAB node and the child IAB node can fulfill at least one of:

a transmit power setting;

a timing operation; and a transmission and reception mode.

24. The method of claim 21, further comprising causing transmission of signaling indicating the information was one of acknowledged (ACK) and negative acknowledged (NACK).

* * * * *